(12) United States Patent
Burch et al.

(10) Patent No.: US 7,647,256 B2
(45) Date of Patent: Jan. 12, 2010

(54) TECHNIQUES FOR ESTABLISHING AND MANAGING A DISTRIBUTED CREDENTIAL STORE

(75) Inventors: Lloyd Leon Burch, Payson, UT (US); Douglas G. Earl, Orem, UT (US); Stephen R. Carter, Spanish Fork, UT (US)

(73) Assignee: Novell, Inc., Provo, UT (US)

( * ) Notice: Subject to any disclaimer, the term of this patent is extended or adjusted under 35 U.S.C. 154(b) by 1147 days.

(21) Appl. No.: 10/767,884

(22) Filed: Jan. 29, 2004

(65) Prior Publication Data

US 2005/0171872 A1 Aug. 4, 2005

(51) Int. Cl.
*A01K 5/02* (2006.01)

(52) U.S. Cl. .................. 705/29; 713/201; 713/150; 726/5; 709/229

(58) Field of Classification Search ................ 705/29; 713/201, 150; 709/229; 707/200; 726/5
See application file for complete search history.

(56) References Cited

U.S. PATENT DOCUMENTS

| | | | |
|---|---|---|---|
| 4,897,781 A | 1/1990 | Chang et al. | |
| 5,913,029 A | 6/1999 | Shostak | 709/203 |
| 5,926,816 A | 7/1999 | Bauer et al. | |
| 6,119,230 A | 9/2000 | Carter | 713/200 |
| 6,223,187 B1 | 4/2001 | Boothby et al. | 707/201 |
| 6,487,665 B1 | 11/2002 | Andrews et al. | |
| 6,553,496 B1 | 4/2003 | Buer | |
| 6,571,287 B1 | 5/2003 | Knight et al. | 709/225 |
| 6,578,034 B1 | 6/2003 | Rafanello | 707/10 |
| 6,578,035 B1 | 6/2003 | Barker | 707/10 |
| 6,718,470 B1* | 4/2004 | Adams | 726/10 |
| 7,062,563 B1* | 6/2006 | Lewis et al. | 709/227 |
| 7,100,195 B1 | 8/2006 | Underwood | |
| 2001/0049786 A1* | 12/2001 | Harrison et al. | 713/156 |
| 2002/0062449 A1 | 5/2002 | DePerna et al. | |
| 2003/0005290 A1* | 1/2003 | Fishman et al. | 713/156 |
| 2003/0131025 A1* | 7/2003 | Zondervan et al. | 707/200 |
| 2004/0064693 A1* | 4/2004 | Pabla et al. | 713/168 |
| 2004/0083367 A1 | 4/2004 | Garg et al. | |

(Continued)

FOREIGN PATENT DOCUMENTS

EP 0547741 A1 6/1993

(Continued)

OTHER PUBLICATIONS

"U.S. Appl. No. 11/145,704, Non-Final Office Action mailed Apr. 7, 2009", 20 pgs.

(Continued)

*Primary Examiner*—Vanel Frenel
(74) *Attorney, Agent, or Firm*—Schwegman, Lundberg & Woessner, P.A.

(57) ABSTRACT

Techniques are provided for establishing and managing a distributed credential store. An identity service aggregates identity information from one or more identity stores and maintains the information as a remote credential store. Initially, the remote credential store, or portions thereof, is transmitted to a principal service as an initial configuration of a local credential store. A principal interacts with the principal service for defining or modifying a policy that identifies portions of the remote credential store which are to be synchronized with the local credential store. In some embodiments, the principal interacts with the principal service for defining a local policy that identifies portions of the local credential store which are not synchronized with the remote credential store. The interactions between the credential stores are trusted and secured.

5 Claims, 3 Drawing Sheets

U.S. PATENT DOCUMENTS

| | | | |
|---|---|---|---|
| 2004/0088563 A1 | 5/2004 | Hogan et al. | |
| 2004/0187031 A1* | 9/2004 | Liddle | 713/201 |
| 2004/0210771 A1* | 10/2004 | Wood et al. | 713/201 |
| 2006/0004610 A1* | 1/2006 | David | 705/3 |
| 2006/0090192 A1 | 4/2006 | Corby et al. | |
| 2006/0277595 A1 | 12/2006 | Kinser et al. | |
| 2008/0016232 A1* | 1/2008 | Yared et al. | 709/229 |

FOREIGN PATENT DOCUMENTS

| | | |
|---|---|---|
| EP | 765062 A2 | 3/1997 |
| EP | 765062 B1 | 11/2005 |
| WO | WO-9906900 | 2/1999 |

OTHER PUBLICATIONS

Goodwin, R , et al., "Instance-Level access control for Business to-Business Electronic Commerce", *PowerPoint Presentation*, Presented By Vandana Janeja,(2001),1-48.

Sun Microsystems, Inc., "Java 2 Platform Enterprise Edition Specification, v1.4", *Sun Microsystems, Inc. User Manual*, Final Release,(Nov. 24, 2003),1-246.

"European Application No. 06113570.3 Office Action dated Nov. 16, 2007", 22 pgs.

* cited by examiner

TECHNIQUES FOR ESTABLISHING AND MANAGING A DISTRIBUTED CREDENTIAL STORE

FIELD OF THE INVENTION

The invention relates generally to network security, and more specifically to techniques for establishing and managing a distributed credential store.

BACKGROUND OF THE INVENTION

As individuals continue using the Internet for connecting to a myriad of services and resources, a variety of confidential information and identity information about those individuals needs to be managed, synchronized, and securely distributed. In many instances, this information is concurrently and manually managed in environments local to the individuals, in local enterprise environments associated with the individuals, and in environments that are local to the services and resources.

Having the identity and confidential information housed and managed in a variety of environments presents a number of challenging problems. For example, individuals are not always properly authenticated into their enterprise environment, which means that access to some information may not be available to individuals who use different computing devices from time to time and who are not properly logged into their appropriate enterprise environments from time to time.

Additionally, management of the identity and confidential information usually occurs in multiple environments. That is, an individual maintains some information, the enterprise maintains other information, and the services or resources maintain still other information. In some cases, the same information is separately managed in duplicate. This creates synchronization problems for the individuals and for network administrators.

Furthermore, the information, as it is being managed and manually maintained or utilized, becomes unduly exposed during network transmissions. This means that each time portions of the information are transmitted for purposes of authentication or for purposes of synchronization it can become compromised and intercepted. This results in a variety of security issues which must be established for network interactions that involve the transfer of the information.

Typically, security measures will entail establishing trust relationships utilizing public-private key pairs with encryption and the like. The encryption is used in secure communications for minimizing exposure to confidential information and identity information. However, mobile individuals may not have static key pairs with services and may often use a laptop to connect from a variety of Internet Service Providers (ISPs), such that the individuals do not have static Internet Protocol (IP) addresses which can uniquely and securely establish the needed trusted relationships between the individuals and other services or resources. Consequently, individuals are often limited in their use of or prohibited in their use of certain confidential and identity information in many contexts when adequate security measures are enforced in conventional manners.

Thus, even the most elaborate conventional techniques that attempt to automate and synchronize an individual's confidential information and identity information still falls short of providing a consistent level of sustainable service, because in many cases the user is unable to effectively access some of his/her needed information.

Thus, there is a need for establishing and managing a distributed credential store, where that credential store can be securely accessed, better managed, and consumed in order to provide an improved level of consistent service.

SUMMARY OF THE INVENTION

In various embodiments of the invention, techniques are presented for establishing and managing a distributed credential store. An identity service interacts and manages one or more identity stores associated with a principal. The identity service and the principal interact according to a trust specification, such that all communications are secure. Initially, the identity service creates an initial configuration instance of a distributed credential store for the principal according to a synchronization policy which is created and maintained by the principal. The synchronization policy defines fields of a remote credential store which are to be kept in synch with a local credential store.

The local credential store is managed by the principal in a processing environment that is local to the principal. The identity service generates a remote credential store which it maintains to synchronize records of the local credential store with affected records of the one or more identity stores. The synchronization is driven by the synchronization policy.

If the principal falls out of communication with the identity service and subsequently re-establishes communication, then the identity service uses the synchronization policy communicated from the principal to generate a new active instance of the remote credential store and bring the principal's local credential store and the remote credential store into synch with one another according to the synchronization policy. The principal can maintain personal entries in the local credential store which are not communicated to and synchronized by the identity service into the remote credential store.

DETAILED DESCRIPTION OF THE INVENTION

In various embodiments of the invention, the term "principal" is used. A principal is an electronic representation of an entity. An entity can be a resource, a user, an agent, an application, a system, a service, a group, a department, an object, etc. An entity consumes information, provides information, or provides a service to other entities over a network. Moreover, an entity can perform combinations of the above mentioned operations.

In one embodiment, the term principal is consistent with how that term is generally understood in the security arts. For example, the term principal can be used in the context of Security Assertion Markup Language (SAML) which is an extension of the Extensible Markup Language (XML). SAML is used for securely processing assertions about a user or application (e.g., principal). More recently, SAML has been extended with technology referred to as Liberty. Liberty is part of the Liberty Alliance Project (LAP) and is attributed to open interoperable standards for federated network identities. Thus, the term principal can also be used in the context of Liberty technologies.

A SAML encoded statement includes an assertion, a protocol, and a binding. There are generally three types of assertions: an authentication assertion used to validate a principal's electronic identity, an attribute assertion that includes specific attributes about the principal, an authorization assertion that identifies what the principal is permitted to do (e.g., policies). The protocol defines how a SAML processing application will ask for and receive the assertions. The binding defines how SAML message exchanges are mapped to Simple Object Access Protocol (SOAP) exchanges, or other protocol exchanges.

In general terms, SAML techniques improve security between business-to-business (B2B) electronic transactions and business-to-customer (B2C) electronic transactions. The techniques permit one principal to log in with a single transaction to a receiving principal and then use a variety of the receiving principal's disparate services by providing the SAML statements when needed. SAML techniques are not limited to inter-organization relationships (e.g., B2B or B2C); the techniques can be used within a single organization (intra-organization). SAML techniques are supported with a variety of network protocols, such as Hypertext Transfer Protocol (HTTP), Simple Mail Transfer Protocol (SMTP), File Transfer Protocol (FTP), SOAP, BizTalk, and Electronic Business XML (ebXML). The Organization for the Advancement of Structured Information Standards (OASIS) is the standards group for SAML. The techniques of Liberty are enhancements to the SAML techniques and may also be used in connection with various embodiments of this invention.

However, it is to be understood that SAML and Liberty techniques are not needed to perform the teachings of all embodiments of the invention. These techniques complement some embodiments of this invention. In this sense, the integration of SAML and Liberty techniques with some of the embodiments presented herein is intended to be part of certain aspects of this invention, but not all embodiments of this invention are dependent on SAML or Liberty technology.

In a similar manner there are various other existing authentication techniques that may be practiced in connection with some embodiments of this invention. But, once again these other authentication techniques are not necessary for realizing the benefits of all embodiments of the invention. Some of these techniques include Public Key Infrastructure (PKI) techniques including public-private key pairs, digital certificates, biometric authentication, or use of conventional identifications and passwords.

A credential store is a file, database, directory, or combinations of the same which houses confidential information and identity information about one or more principals. The confidential information is defined by attribute fields that identify a type of confidential data; each attribute field is populated with specific attribute values which identify the values associated with confidential data.

A credential store also includes identity/authentication information and or authentication techniques or services associated with authenticating principals vis-à-vis other principals. In some cases the identity information is a legacy identification and password pair. In other cases, the identity information is a certificate or an assertion, such as a SAML or Liberty assertion that identifies what identity information is needed to authenticate and how that authentication is to take place.

The credential store also includes policies that define how attributes can or cannot be processed in a given principal-to-principal relationship. The authentication information, authentication techniques/services, attributes, and policies combine to form credentialing information records that populate the credential store. Furthermore, a credential store need not reside contiguously within storage or memory. That is, a credential store can be logically assembled from a variety of other identity stores residing in a plurality of remote storage and memory locations.

A distributed credential store is one that is maintained locally from within a local environment of a principal, but incorporates and synchronizes in whole or in part with a remote credential store. A single distributed credential store can be associated with a single principal. Alternatively, a single distributed credential store can be used to manage a plurality of principals. In this latter embodiment, each entry within the distributed credential store is uniquely encrypted for a particular principal's use.

Various embodiments of this invention can be implemented in existing network products and services. For example, in some embodiments, the techniques presented herein are implemented in whole or in part in the iChain®, Border Manager®, and Excelerator® products distributed by Novell, Inc., of Provo, Utah.

Of course, the embodiments of the invention can be implemented in a variety of architectural platforms, systems, or applications. For example, portions of this invention can be implemented in whole or in part in any distributed architecture platform, operating systems, proxy services, or browser/client applications. Any particular architectural layout or implementation presented herein is provided for purposes of illustration and comprehension only and is not intended to limit aspects of the invention.

Figure 1:
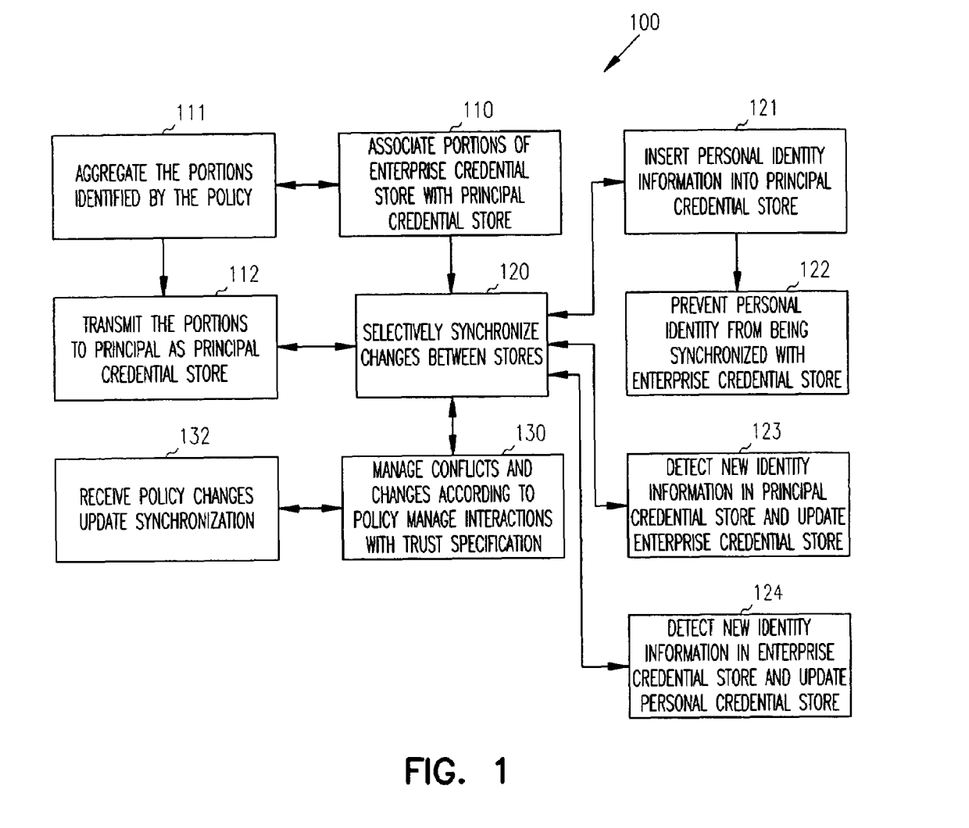
FIG. 1 is a flowchart representing a method for managing a distributed credential store.

FIG. 1 is a flowchart representing one method 100 for managing a distributed credential store. The method 100 is implemented as one or more applications or services which reside in a computer-accessible medium and is accessible over a network. Some portions of the processing of the method 100 (hereinafter "processing") operates in an external computing environment from a principal while other portions of the processing operates in a local computing environment of the principal. The two processing portions are interfaced using any existing or customized protocols and application programming interfaces (APIs). In some embodiments, a principal's local processing interfaces with the external processing via a World-Wide Web (WWW) browser operating within a client of the principal. A client is a processing device from which the browser is operating on.

Initially, an identity service is in a trusted relationship with one or more identity stores that house attribute and identity information about one or more principals. The identity service is capable of authenticating a principal and establishing a secure communication with that principal vis-à-vis other different principals with which the principal may interact. In some cases, that secure communication entails the identity service encrypting communications and signing communications with public-private key pairs. The principal via a client service can decrypt the communications using its own private key and a public key associated with the identity service.

A sample technique for secure and trusted relationships between a principal and an identity service can be found in "Techniques for Dynamically Establishing and Managing Authentication and Trust Relationships," commonly assigned to Novell, Inc., of Provo, Utah; filed on Jan. 27, 2004, and having a U.S. Ser. No. 10/765,523, which has issued as U.S. Pat. No. 7,299,493, issued on Nov. 20, 2007; the disclosure of which is incorporated by reference herein.

Information and transactions that the principal can send and receive from the identity service may exist in global policies defined in a trust specification between the identity service and the principal. The trust specification can be managed, owned, and controlled by appropriate network administrators and modified as needed to enable or disable features of the present invention. The trust specification will also dictate the type of secure communications and methods used during interactions between the identity service and the principal. In some cases, the identity service and the principal can communicate with one another via SAML or Liberty assertions and their associated protocols. The trust specification also ensures that communications about a credential store are secure and verifiable in order to maintain proper security.

Initially, the principal desires to establish an initial instance of a distributed credential store. This entails creating a local credential store and a remote credential store and a policy that will drive the synchronization between the local and remote credential data stores. The interaction between the local and remote credential store and the results that it produces in the local credential store is an instance of the distributed credential store.

One way to create an initial instance of the distributed credential store is for the principal to request the initial instance (pull) from the identity service. Another way to create an instance is for the identity service or some other third-party to independently request or generate an instance of the distributed credential store for a particular principal (push). Thus, an initial instance of a distributed credential store can be generated or created from either a push or pull model.

Once a push or pull request is initially received, the identity service validates that the request is permissible and if it is generates an initial instance of a distributed credential store. In one embodiment, the identity service generates the initial instance by inspecting a global contract associated with a particular principal and by inspecting the appropriate trust specification and global policies. The global contract defines how a principal is authenticated to various other principals using specific identifying information. The global contract also provides information that permits the identity service to acquire appropriate attribute information for a given relationship of the principal vis-à-vis other principals.

The global policy may restrict certain relationships based on physical locations, time limitations, calendar day limitations, or specific predefined events which limit certain relationships. The global contract identifies the specific identity stores which house the needed information needed by the identity service in order to construct an initial instance of the distributed credential store. The trust specification identifies how the identity service and the principal will communicate with one another about the distributed credential store in order to satisfy themselves that each communication is secure and trusted.

Once the global contract, global policy, and trust specification are inspected and evaluated, records associated with the distributed credential store are generated and either batched until entirely assembled or streamed individually as assembled using the secure communications defined in the trust specification directly to the principal. Each record includes a particular relationship between a principal vis-à-vis another principal and includes authentication information, authentication techniques/services, attributes, and policies. The authentication information and authentication techniques/services are used to authenticate the principal to another principal defined in the record. In some cases, the authentication information and authentication techniques/ services are represented as a certificate, and can be optionally provided as a SAML or Liberty assertion. The attribute information identifies confidential information that can be accessed or not accessed during the relationship defined by the record. Policies are also included in the record that identifies the operations which are permissible or not permissible against the attributes during a relationship defined by the record. Each record can be viewed as a credential for a particular principal-to-principal relationship.

The description presented above provides the context with which a distributed credential data store is initially established, configured, and communicated to the local environment of a principal. Once this initial configuration is received it is established as a principal (local) credential store by the principal.

The records established by the identity service form an enterprise credential store, which is maintained and managed by the identity service in concert with the principal credential store. Accordingly, at 110, portions of the enterprise credential store are associated or linked by the identity service to appropriate portions of the principal credential store, which is managed by a principal service of the principal.

In one embodiment, at 111, the identity service selectively aggregates or maintains metadata such as links associated with one or more records of appropriate identity stores as defined by a policy or contract associated with the principal. The identity service can maintain contents of selective identity records or maintain links to the selective identity records of appropriate identity stores. These duplicated records or maintained links form the enterprise credential store which the identity service manages.

The identity service is configured to detect when changes to the duplicated records or maintained links are made in the identity stores via a data store event that is trapped and monitored by the identity service. Thus, if an administrator alters a record of an identity store that the identity service is tracking as part of the enterprise credential store, the identity service is in a position to acquire the changes and transmit, at 112 the changes to the principal credential store, if desired.

The principal via its principal service communicates an initial synchronization policy to the identity service. With this synchronization policy, both the identity service and the principal service know which portions of the enterprise credential store and the principal credential store are to be selectively synchronized with one another, as depicted at 120.

The synchronization policy can be maintained by the principal service of the principal. This has the added benefit of permitting the principal service and the identity service to synchronize after an initial configuration of the distributed credential store has been instantiated for a principal but where the principal drops out of communication with the identity service for some period of time. For example, suppose that a principal acquires an initial principal credential store from the identity service and the identity service generates an active enterprise credential store related to the principal credential store.

Now suppose that the principal logs off of or terminates communication with the identity service for some extended period of time and then at a later time re-establishes communication with the identity service. The principal will have a principal credential store which may or may not have been modified during the lapse of non communication, and in a similar manner one or more records that were previously associated with an active enterprise credential store may have changed during the period of non communication within one or more affected identity stores.

The identity service can automatically generate a new up-to-date instance of a needed enterprise credential store and synchronize with any modified principal credential store via the principal's local synchronization policy which the principal communicates during initial re-communication to the identity service. If there are conflicts between changes of the personal credential store and the newly instantiated enterprise credential store, the conflicts can be resolved by the policy.

The principal, in some embodiments, may desire to maintain some personal credential information associated with private business or affairs of the principal separate and distinct from the management of the enterprise credential store. In these embodiments, at 121, the principal can selectively insert this personal credential information into the principal credential store where it is maintained and managed by the principal service of the principal. However, if this personal information is defined by a local synchronization policy of the principal as information that is not to be synchronized with the enterprise credential store, then, at 122, the enterprise credential store is prevented from acquiring or synchronizing with this personal credentialing information.

Conversely, some new or modified identity information can be inserted or changed by the principal within the principal credential store, at 123, and according to the synchronization policy automatically communicated to the identity service and updated to the enterprise credential store. An update to the enterprise credential store will force the identity service to update the effected records in the appropriate identity stores.

In a like manner, at 124, if the synchronization policy dictates, any changes detected in the enterprise credential store will generate automatic updates to the appropriate records of the principal credential store.

All interactions between the enterprise credential store and the principal credential store occur according to the strictures of the overall trust specification between the identity service and the principal. Accordingly, at 130, all conflicts and communications are maintained in conformance with the trust specification and the overall global policies and contracts held between the identity service and the principal.

Moreover, the principal via the principal service can alter the synchronization policy and communicate the changes to the identity service at 132. This permits the principal to control what is and what is not synchronized. Of course, in some embodiments, a global policy or contract associated with the principal at the identity service level can constrain what portions of the policy which can be modified and driven by the principal.

Embodiments of method 100 demonstrate how a principal can interact with an identity service for purposes of managing and controlling its own version of a credential store. This principal credential store can be encrypted and maintained in a local environment of the principal or on a client processing device of the principal. Each time the principal re-establishes communication with the identity service, the principal's synchronization policy can be used to re-synchronize the principal credential store with an identity service generated enterprise credential store. This permits a principal to move around and independently access needed credentialing information to successfully interact with other principals. It also permits the principal to maintain some information which is never synchronized to the enterprise or known to the enterprise. Moreover, no communication between the principal credential store and the enterprise credential store occur outside of trusted communications defined by a trust specification.

Figure 2:
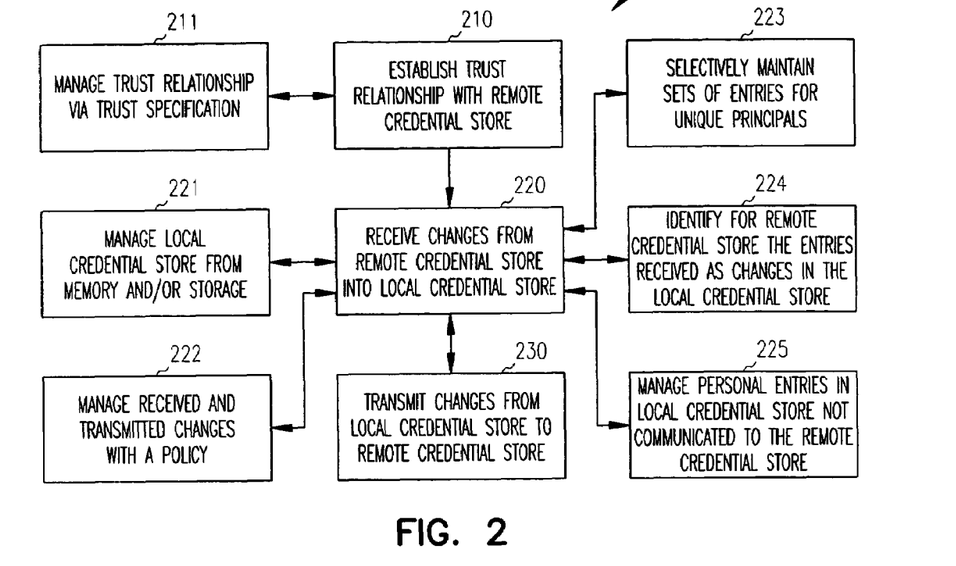
FIG. 2 is a flowchart representing another method for managing a distributed credential store.

FIG. 2 is a flow diagram of another method 200 for managing a distributed credential store. The method is implemented in a computer readable medium and is accessible over any network. The processing of the method 200 (hereinafter "processing") represents processing performed by a client or principal service that interacts with an identity service. In one embodiment, the interface between some portions of the processing and the identity service is implemented within a WWW browser. In some embodiments, the processing is a service that manages a local credential store on behalf of multiple principals that interact with the identity service, in this sense the local credential store can logically represent multiple unique principal credential stores as discussed above with FIG. 1.

At 210, the processing establishes and initiates a trusted and secure relationship with a remote credential store via an identity service. The identity service has access to one or more identity stores associated with one or more principals. The identity service logically assembles a remote credential store from the one or more identity stores on behalf of the processing. The remote credential store includes one or more enterprise credential stores similar to what was discussed above with respect to FIG. 1. The trust relationship between the generated remote credential store and the processing is defined and driven by a trust specification as depicted at 211.

At 220, the processing receives changes associated with one or more entries in the remote credential store into the local credential store. That is, a synchronization policy informs the identity service as to which records or entries associated with whole records or portions of records included within the remote credential store which are to be automatically communicated to the processing and updated to the appropriate affected entries of the local credential store. For efficiency purposes, the processing can manage some portions of the local credential store from memory and some portions from storage as depicted at 221. Again, at 222, the entries that are synchronized into the local credential store and transmitted from the local credential store to the remote credential store are managed by a local synchronization policy which can be communicated in whole or in part to the identity service for purposes of managing the synchronization of the remote credential store.

In one embodiment, at 223, the processing manages the local credential store for multiple unique principals. This may be advantageous when a single local credential store is servicing a plurality of principals within a local network. In these instances, each entry within the local credential store is uniquely associated with a particular unique principal. Moreover, in some embodiments, each unique entry can be uniquely encrypted in a manner such that only the associated principal knows the proper decryption algorithm. This permits the processing to securely service multiple principals from a single local credential store.

The local synchronization policy will permit the processing, at 224, to automatically communicate changes with entries in the local credential store to the remote credential store via its identity service. As was discussed with FIG. 1, some entries in the local credential store will remain private or personal to the local credential store and will therefore not be communicated to the remote credential store. Again, these personal entries will be defined in the local synchronization policy and are not communicated or known to the remote credential store via the identity service. Accordingly, at 225, the processing manages some personal entries in the local credential store which are independent of and not communicated to or synchronized with the remote credential store.

At 230, any detected changes to entries of the local credential store which are identified as entries which the processing wants the remote credential store to synchronize with (via the local synchronization policy) are transmitted to the remote credential store via the identity service.

The processing of FIG. 2 permits one or more principals to establish and manage a local credential store which selectively synchronizes with a remote credential store. The principals may from time to time drop out of communication with an identity service having the remote credential store; however, the principals will still maintain and have direct access to the local credential store. The local credential store provides the principals with credentialing information that the principals can use to authenticate with and interact with other different principals. When the principals re-establish communications with the identity service, any changes which are desired to be synchronized with the remote credential store can be automatically synchronized via trusted and secure communications defined by a trust specification between the processing and an identity service of the remote credential store.

Figure 3:
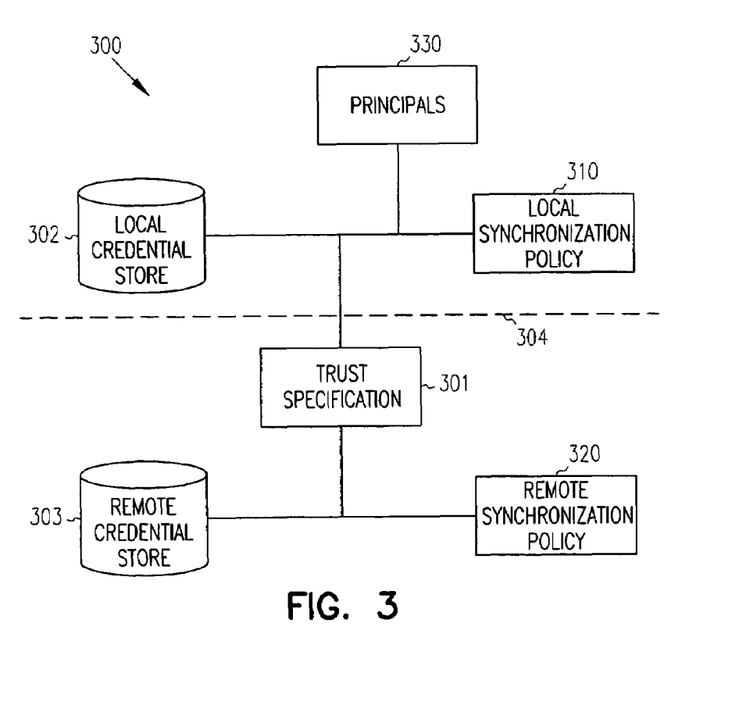
FIG. 3 is a diagram of a distributed credential management system.

FIG. 3 is a diagram of a distributed credential management system 300. The distributed credential management system 300 is implemented in a computer readable medium and accessible over a network. In some embodiments, the distributed credential management system 300 implements the processing described above with respect to methods 100 and 200 of FIGS. 1 and 2, respectively.

The distributed credential management system 300 includes a trust specification 301, a local credential store 302, and a remote credential store 303. The local credential store 302 resides in the local computing environment of one or more principals 330. In one embodiment, the local credential store 302 resides on a client of a particular principal 330. In another embodiment, the local credential store 302 resides within a local secure network that is accessible to multiple principals 330.

Conversely, the remote credential store 303 resides remotely and external to the local computing environment of the principal 330. It is accessible via a network 304. The remote credential store is logically assembled and associated with selective attributes and identity information about the principal 330 and acquired from or maintained from one or more identity stores.

The local credential store 302 and the remote credential store 303 interact with one another via the network 304 with secure communications defined by the trust specification 301. The synchronization between entries of the remote credential store 303 and the local credential store 302 and vice versa are driven by synchronization policies 310 and 320.

The local credential store 302 includes a local synchronization policy 310 which drives and defines the remote synchronization policy 320. The principal 330 defines the local synchronization policy 310 by identifying entries from the remote credential store 303 which are to be automatically synchronized with entries of the local credential store 302. The principal 330 also defines entries or portions of the local synchronization policy 310 which are to be synchronized and not synchronized with the remote credential store 303. The entries or portions which are to be synchronized are communicated from the local synchronization policy 310 over the network 304 to the remote synchronization policy 320.

In some embodiments, after the principal 330 has been out of communication with the remote credential store 303 for any period of time and then re-establishes communication via the network 304, appropriate portions of the local synchronization policy 310 are immediately communicated to establish a new instance of the remote synchronization policy 320. This new instance of the remote synchronization policy 320 permits an identity service associated with the remote credential store 303 to generate a new and active instance of the remote credential store 303 and synchronize appropriate portions of the remote and local credential stores 303 and 302, respectively.

In one embodiment, the local credential store 302 services multiple principals 310 and is accessible via a server or service to each of the multiple principals 330. In this embodiment, the local credential store 302 manages each unique principal 330 with uniquely encrypted records; where each encrypted record is encrypted in a format only know to its associated principal 330. Thus, the distributed management system 300 can be used by a single principal 330 or by multiple principals 330 within a local network with one another.

Figure 4:
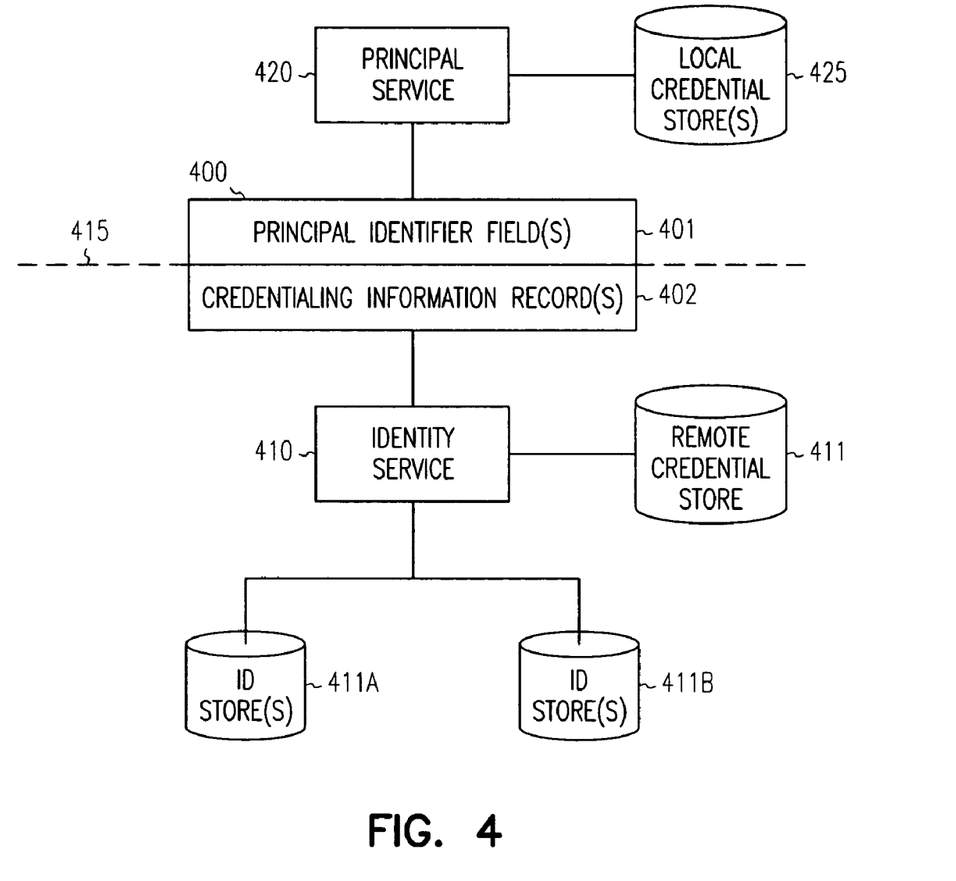
FIG. 4 is a diagram representing a distributed credential store.

FIG. 4 is a diagram of a distributed credential store 400. The distributed credential store 400 is implemented in a computer readable medium and is accessible over a network 415. The distributed credential 400 is logically assembled and coordinated over the network 415 and is represented within a local environment of one or more principals as one or more local credential stores 425 and represented external to the local environments as a remote credential store 411.

The distributed credential store 400 includes principal identifier fields 401 and credentialing information records 402. Each principal identifier field 401 is capable of housing a principal identifier value. Each unique principal identifier value is associated with credentialing information housed in the credential information record 402.

The credentialing information houses authentication information, authentication techniques/services, attributes, and policies that define authentication and interactions between a particular principal identified by a principal identifier value of a principal identifier field 401 vis-à-vis a different principal. In one embodiment, the authentication information and authentication techniques/services defined in any particular credentialing information are represented as a certificate. In some cases, the certificate can be expresses as a SAML or Liberty assertion.

An initial instance of the distributed credential store 400 is created or instantiated by an identity service 410 when requested from a principal service 420 (pull model) or when requested by a different principal on behalf of a particular principal (push model). Once an initial created instance of the distributed credential store 400 is established, it is managed within the local environments of the principals by the principal service 420 as one or more local credential stores 425. If the principal service 420 falls out of communication with the identity service 401 for any period of time, the identity service can resynchronize the local credential store 425 as soon as communications are subsequently re-established between the identity service 410 and the principal service 420.

Synchronization occurs via a synchronization policy, which is managed and controlled by the principal service 420. This policy is communicated from the principal service 420 to the identity service 410 and permits the identity service 410 to generate active instances of a remote credential store 411. The remote credential store is managed by the identity service 411 and corresponds to those portions of the distributed credential store 400 that are defined in the synchronization policy which are to be synchronized in the local credential store 425.

The remote credential store 411 is assembled and locally linked to appropriate records housed in one or more identity stores 411A and 411B. When the identity service 410 detects that changes defined in the synchronization policy occur to records being tracked in the distributed credential store 400, these changes are communicated to the principal service 420 for update to the local credential store 425 or these changes are updated to the appropriate records of the one or more identity stores 411A and 411B (in cases where the changes are detected as occurring within the local credential store 425).

The principal service 420 also maintains a number of credentialing information records 402 in the local credential store 425 which are not communicated and synchronized to the remote credential store 411. This is useful when a particular principal is maintaining personal credentialing information which it does not desire the identity service 410 to know about or to manage.

All communications occurring between the principal service 420 and the identity service 410 are performed according to a trust specification which can be inspected and validated for each communication. This permits both the principal service 420 and the identity service 410 to satisfy their selves that communications are legitimate and authorized.

In some embodiments, the principal service 420 resides as a server application or service to multiple principals. In these embodiments, the local credential store 425 can be segmented into records associated with each unique principal being serviced, where sets of the records associated with any particular principal is encrypted in a format only known to that particular principal.

The distributed credential store 400 permits principals to have access to needed credentialing information from their local and personal computing environments at all times. Thus, a principal has needed credentialing information for interacting with another principal even when the principal falls out of direct communication with the identity service 410. The principal can re-synchronize with the remote credential store 411 when it re-establishes communication with the identity service 410 and communicates its synchronization policy. Any conflicts can be resolved by a global contract or global policy associated with a particular principal and maintained and managed by the identity service 410.

Although specific embodiments have been illustrated and described herein, those of ordinary skill in the art will appreciate that any arrangement calculated to achieve the same purpose can be substituted for the specific embodiments shown. This disclosure is intended to cover all adaptations or variations of various embodiments of the invention. It is to be understood that the above description has been made in an illustrative fashion only. Combinations of the above embodiments, and other embodiments not specifically described herein will be apparent to one of ordinary skill in the art upon reviewing the above description. The scope of various embodiments of the invention includes any other applications in which the above structures and methods are used. Therefore, the scope of various embodiments of the invention should be determined with reference to the appended claims, along with the full range of equivalents to which such claims are entitled.

It is emphasized that the Abstract is provided to comply with 37 C.F.R. §1.72(b), which requires an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in single embodiments for the purpose of description. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. The following claims are hereby incorporated into the Detailed Description, with each claim standing on its own as a separate preferred embodiment.

What is claimed is:

1. A method for managing a distributed credential store, the method implemented in a computer-readable medium and is executed by a client, the method comprising:

establishing, by the client, a trust relationship with a remote credential store via an identity service, the identity service logically assembles and creates the remote credential store from multiple identity stores and the identity service generates the remote credential store by inspecting a global contract associated with a principal that is a user, by inspecting a trust specification, and by inspecting global policies, wherein the global contract defines how the principal is authenticated to various other principals or other users using specific identifying information and the global contract provides information that permits the identity service to acquire attribute information for a given relationship of the principal in relation to the other principals, and the global contract identifies the multiple identity stores used to assemble the remote credential store, and wherein the global policies restrict certain relationships based on physical locations, time limitations, calendar day limitations, or specific predefined events that restrict the certain relationships, and wherein the trust specification dictates a type of secure communication and methods of that secure communication that are to be used when the principal interacts with the identity service and the trust specification ensures that other communications directed to the remote credential store or a local credential store of the principal are secure and verifiable;

receiving, by the client, changes associated with one or more entries in the remote credential store into the local credential store;

transmitting, by the client, changes associated with one or more entries in the local credential store to the remote credential store, wherein the local credential store includes a local synchronization policy defined and created by the user and the changes that are received from the remote credential store and the changes that are transmitted from the local credential store are defined in the local synchronization policy, the local synchronization policy defines fields of the remote credential store that are to be selectively synchronized with the local credential store;

maintaining, by the client, selective sets of the one or more entries within the local credential store for separate unique principals, each entry associated with a particular unique principal and each entry uniquely encrypted for its particular unique principal where that unique principal knows the proper decryption algorithm.

2. The method of claim 1 further comprising identifying, by the client and for the remote credential store the one or more entries in the remote credential store which are to be received as the changes.

3. The method of claim 2 further comprising managing, by the client, one or more personal identity information entries within the local credential store which are not transmitted as the changes associated with the one or more entries in the local credential store to the remote credential store.

4. The method of claim 1 further comprising managing, by the client, portions of the local credential store from memory and managing other portions from storage.

5. The method of claim 1 further comprising managing, by the client, the trust relationship between the local credential store and the remote credential store using the trust specification.

* * * * *

UNITED STATES PATENT AND TRADEMARK OFFICE
CERTIFICATE OF CORRECTION

PATENT NO. : 7,647,256 B2  
APPLICATION NO. : 10/767884  
DATED : January 12, 2010  
INVENTOR(S) : Burch et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1425 days.

Signed and Sealed this

Twenty-eighth Day of December, 2010

David J. Kappos  
*Director of the United States Patent and Trademark Office*